(12) United States Patent
Kusuura (10) Patent No.: US 8,703,062 B2
(45) Date of Patent: Apr. 22, 2014

(54) AIR PURIFICATION

(71) Applicant: Empire Technology Development LLC, Wilmington, DE (US)

(72) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/860,432

(22) Filed: Apr. 10, 2013

(65) Prior Publication Data

US 2013/0224079 A1 Aug. 29, 2013

Related U.S. Application Data

(62) Division of application No. 13/148,919, filed as application No. PCT/US2011/034859 on May 2, 2011, now Pat. No. 8,444,922.

(51) Int. Cl.
*B01D 39/00* (2006.01)
*B01D 46/00* (2006.01)
*B01D 57/00* (2006.01)
*B01D 57/02* (2006.01)
*B03C 3/013* (2006.01)
*B03C 3/09* (2006.01)

(52) U.S. Cl.
USPC .......... 422/120; 422/121; 422/122; 422/123; 422/186; 95/285; 55/524

(58) Field of Classification Search
USPC ............... 422/120–123, 186; 95/285; 55/524
See application file for complete search history.

(56) References Cited

U.S. PATENT DOCUMENTS

| 3,589,106 | A | 6/1971 | Onuki et al. |
| 4,694,179 | A | 9/1987 | Lew et al. |
| 5,540,761 | A | 7/1996 | Yamamoto et al. |
| 5,549,735 | A | 8/1996 | Coppom et al. |
| 8,444,922 | B2 * | 5/2013 | Kusuura ........................ 422/120 |
| 2011/0085952 | A1 | 4/2011 | Sasson et al. |
| 2012/0282157 | A1 | 11/2012 | Kusuura |

FOREIGN PATENT DOCUMENTS

| JP | 2008-526821 | 7/2008 |
| JP | 2009-066027 | 4/2009 |
| JP | 2009-138254 | 6/2009 |
| JP | 2010-18840 | 1/2010 |
| WO | WO 81/02530 A1 | 9/1981 |
| WO | WO 2006/072775 | 7/2006 |
| WO | WO 2012/150927 | 11/2012 |

OTHER PUBLICATIONS

Ainashef et al., "Electrochemical Generation of Superoxide in Room-Temperature Ionic Liquids." Electrochemical and Solid-State Letters, 2001, pp. D16-D18, vol. 4 (11).

"Air Cleaner," Wikipedia printout from http://ja.wikipedia.org/wiki/%E3%82%a8%E3%82%A2%E3%82%AF%E3%83%AA%E3%83%BC%E3%83%8A%E3%83%BC, printed Aug. 9, 2011, last updated Sep. 17, 2010, 3 pages.

(Continued)

*Primary Examiner* — Timothy Vanoy
(74) *Attorney, Agent, or Firm* — Knobbe, Martens, Olson & Bear LLP (57) ABSTRACT

The present disclosure relates to purification and/or sterilization techniques and devices. Methods and systems are provided herein for removing contaminants from air using a combination of an ionic liquid and a reactive oxygen species.

23 Claims, 4 Drawing Sheets (56) References Cited

OTHER PUBLICATIONS

"Air Filter," http://en.wikipedia.org/wiki/Air_filter, printed Jul. 25, 2011, last modified Jul. 19, 2011, 4 pages.

Bara et al., "Guide to CO2 Separations in Imidazolium-Based Room-Temperature Ionic Liquids." Ind. Eng. Chem.Res., 2009, pp. 2739-2751, vol. 48 (6).

Birnie et al., "Photocatalytic Reactors: Design for Effective Air Purification," International Journal of Low Carbon Technologies 1/1, Jan. 2006, pp. 47-58.

"Development of Ozone UV type High-speed Water Treatment Equipment," Press release by Mitsubishi Electric Corporation, dated Nov. 26, 2003, printed Jul. 25, 2011, 4 pages.

Hashimoto et al., "ESR Measurement and Antimicrobial Evaluation of Activated Oxygen Species Generated from Aluminum Anodic Oxide Film by Photoirradiation," Journal of Japan Institute of Light Metals, 2006, pp. 474-477, vol. 56 (9).

Imides (Ionic Liquids) printout from EMD Chemicals USA webpage, http://www.emdchemicals.com/imides-ionic-liquids/c_r6Cb.s1OaaMAAAEjgmULFwSh, (© 2011) printed Mar. 24, 2011, 1 page.

"Inline Blower," http://blower.edu.ms/fireplace-blower-indiana/page-77.html#, posting dated Sep. 10, 2009, (© 2010) printed Mar. 24, 2011, 3 pages.

International Search Report and Written Opinion dated Jul. 6, 2011 in Appl. No. PCT/US2011/034859, filed May 2, 2011.

"Ionic Liquid," http://en.wikipedia.org/wiki/Ionic_liquid, Available at least in some form before Jul. 23, 2011 and last modified Jul. 23, 2011, printed Jul. 25, 2011, 10 pages.

"Ionic Liquids" printout from Tokyo Chemical Industry Co.,Ltd. webpage, http://www.tokyokasei.co.jp/product/synthetic-chem/S019.shtml, publication date unknown, printed Mar. 24, 2011, 8 pages.

"Ionic Liquids—Cations" printout from EMD Chemicals USA webpage, http://www.emdchemicals.com/ionic-liquids-cations/c_HGOb.s1Lhu8AAAEWqOEfVhT1, (© 2011) printed Mar. 24, 2011, 1 page.

"Laminated metal filter," http://www.semitec.net/wirefilter.html, Homepage of Semitec Corporation, Available before Jul. 25, 2011, printed Jul. 25, 2011, 3 pages.

"Metal Mesh," http://www.metalmesh.com.au, Homepage of Metal Mesh Pty. Ltd., (© 2011) printed Jul. 25, 2011.

Ozone Purifier printout from http://www.oemcollect.com/WaterPurifiersW300.htm, publication date unknown, printed Mar. 24, 2011, 3 pages.

Raupp et al., "First-Principles Modeling, Scaling Laws and Design of Structured Photocatalytic Oxidation Reactors for Air Purification," Catalysis Today, 2001, pp. 41-49, vol. 69.

Sanyo ABC-VW24 Air Washer Air Purification System with Electrolyzed Water Technology printout from Amazon.com, initial publication date unknown, printed Jul. 22, 2011, 8 pages.

Suda et al., "Plasma Discharge Deodorizing System," Technical Report of Panasonic Electric Works Co., Ltd., Dec. 2001, 6 pages.

Sugaware et al., "Optical cleaning using a dielectric barrier discharge excimer lamp," Technical Journal "Light Age", 1996, 2 pages, vol. 8.

Wang et al., "Oxidative Desulfurization of Dibenzothiophene Using Ozone and Hydrogen Peroxide in Ionic Liquid," Energy Fuels, (2010), pp. 2527-2529, vol. 24.

Watanabe, "Current and Future Scopes of Ionic Liquid Studies," Surface Science, 2007, pp. 298-303, vol. 28 (6).

"Sports Air Filter, Normal Replace," Copyright Knight sports, Co., Ltd., accessed at http://www.knightsports.co.jp/product/post_95/ accessed on Nov. 12, 2013, pp. 1-2 (Machine Translation).

Consideration of long-life effect of folding bellows, Air Filter, accessed at http://daiwa-y.oops.jp/modules/tinyd1/index.php?id=3, accessed on Nov. 12, 2013, pp. 1-3 (Machine Translation).

International Preliminary Report on Patentability dated Nov. 14, 2013, received in International Application No. PCT/US2011/034859.

* cited by examiner

AIR PURIFICATION

REFERENCE TO RELATED APPLICATION

This application is a divisional of U.S. application Ser. No. 13/148,919, which was the U.S. National Phase of entry under 35 U.S.C. §371 of International Application PCT/US2011/034859, filed May 2, 2011, entitled "AIR PURIFICATION," the entireties of which are incorporated herein by reference.

TECHNICAL FIELD

The relevant field generally relates to removing contaminants from air and various gases.

BACKGROUND

Filtration devices for removing contaminants from air or other gases are generally known. Common applications for air filtration include automotive applications and commercial air filtration.

Various types of filters are commercially available. For example, HEPA filters are commonly used to purify air by forcing air through the filter with particles physically captured by the filter. HEPA filters are required to remove at least 99.97% of contaminants of 0.3 micrometers or larger. Other types of commercial filters are also available, such as cloth filters, stainless steel membrane filters, fiberglass filters, and polyester filters.

SUMMARY

In some embodiments, methods are provided for removing a contaminant from air. In some embodiments, the method includes providing a wet filter with an ionic liquid, generating a reactive oxygen species and dissolving the reactive oxygen species in the ionic liquid. In some embodiments, one can further flow contaminated air with a contaminant against the wet filter to allow air within the contaminated air to flow completely through the wet filter while allowing the reactive oxygen species in the ionic liquid to react with the contaminant from the air. This can allow one to remove a contaminant from air.

In some embodiments, a kit is provided. In some embodiments, the kit can include a wet filter with pores that pass through the wet filter, from a first to a second surface. The kit can also include an ionic liquid and a reactive oxygen species generator.

In some embodiments a filter cartridge is provided. In some embodiments, the filter cartridge can include the following: an anode, a cathode, a porous material that has pores that pass from a front surface of the porous material to a back surface of the porous material so as to allow air to flow from the front surface through and out of the back surface of the porous material. In some embodiments, the porous material is also configured to retain an ionic liquid. In some embodiments, the anode and the cathode are positioned on opposite sides of the porous material.

In some embodiments an apparatus is provided. The apparatus can include an ionic liquid and a wet filter with uninterrupted holes that pass from a first surface of the wet filter to an opposite second surface of the wet filter. In some embodiments, the wet filter contains the ionic liquid. In some embodiments, a reactive oxygen species generator is also provided and configured to generate reactive oxygen species within the ionic liquid.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

With some air cleaning techniques, a reactive oxygen species or water containing reactive oxygen species can be used and/or sprayed into a space for cleaning the air. With these techniques, however, the lifetime of the reactive oxygen species is short, e.g. about 5 seconds in water at a pH of 7. As such, it can be difficult for a reactive oxygen species to remain active and continue to clean because of the short lifetime of the reactive oxygen species.

In some embodiments, the methods and apparatuses disclosed herein advantageously allow the reactive oxygen species to exist more stably by the use of an ionic liquid. In some embodiments, at least one filter or porous member can be impregnated with at least one ionic liquid and at least one reactive oxygen species can be dissolved in the ionic liquid. In such an arrangement, air passing through the filter contacts the reactive oxygen species, while the reactive oxygen species can be stabilized by the presence of the ionic liquid. In some embodiments, the reactive oxygen species can react with contaminants in the air thereby removing the contaminants from the air and/or gas flowing through the filter. In some embodiments, reactive oxygen species can be generated by a reactive oxygen species generator to create or maintain a desired concentration of reactive oxygen species in the filter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is arranged to first provide an outline of various embodiments in light of the provided figures. Following this section, a selection of additional aspects or variations for various aspects is provided. Finally, a selection of examples is provided. The headings used are for convenience only and are in no way intended to limit or exclude additional and/or alternative embodiments and/or combinations.

Figure 1:
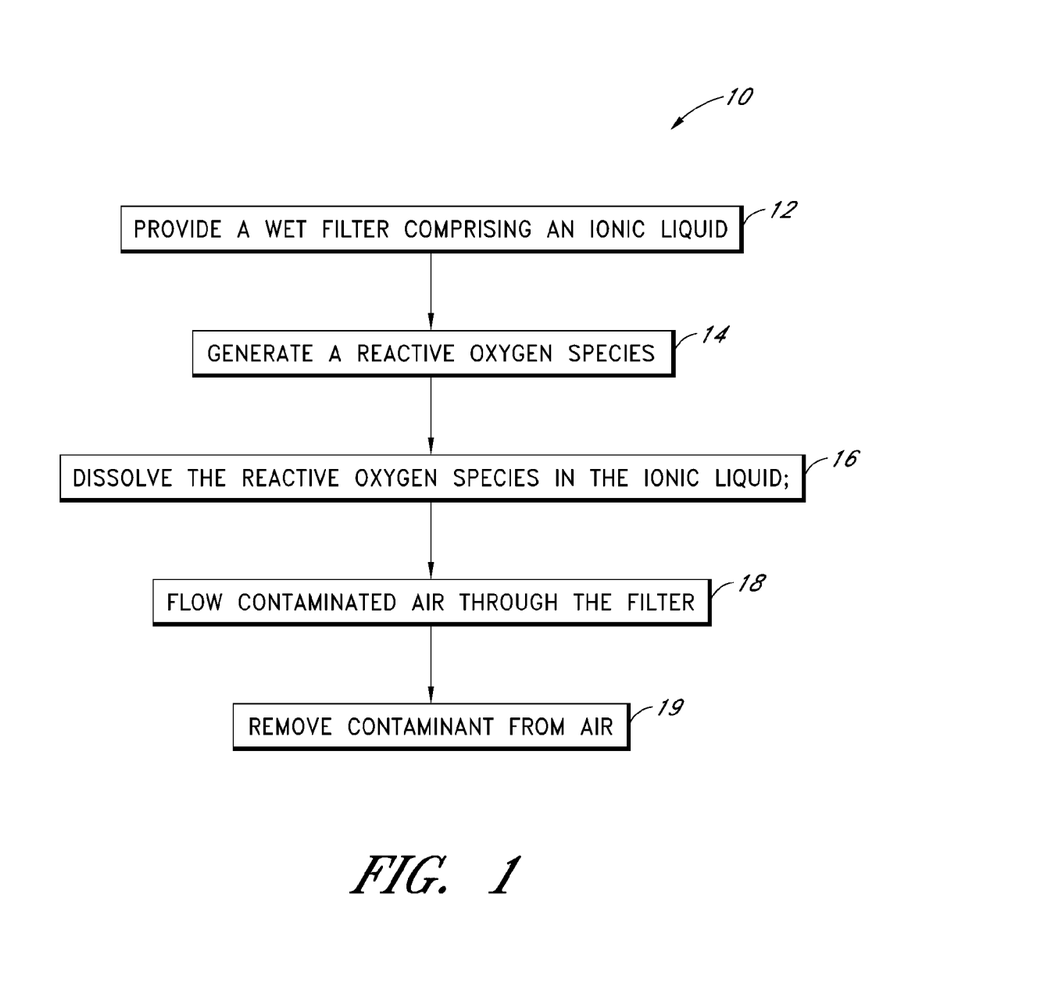
FIG. 1 is a schematic flowchart illustrating a method in accordance with some embodiments.

FIG. 1 is a schematic flowchart illustrating a method 10 for removing contaminants from air in accordance with some embodiments. In some embodiments, a wet filter is provided with an ionic liquid 12. A reactive oxygen species is generated including oxygen 14. The reactive oxygen species can be dissolved into the ionic liquid 16. This arrangement allows for the reactive oxygen species to exist for a relatively long period of time, allowing the reactive oxygen species more opportunity to interact with a contaminant in the air (and thereby remove and/or sterilize the contaminant). As shown in FIG. 1, contaminated air can be contacted with filter 18 and/or flowed through the filter 18. Any contaminant in the air can then be removed from the air 19 (and/or sterilized) by the reactive oxygen species. This arrangement allows for the reactive oxygen species to survive for a relatively long period of time as it is within the ionic liquid, while still be useful as a filter and/or sterilizing agent.

One skilled in the art, given the present disclosure, will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
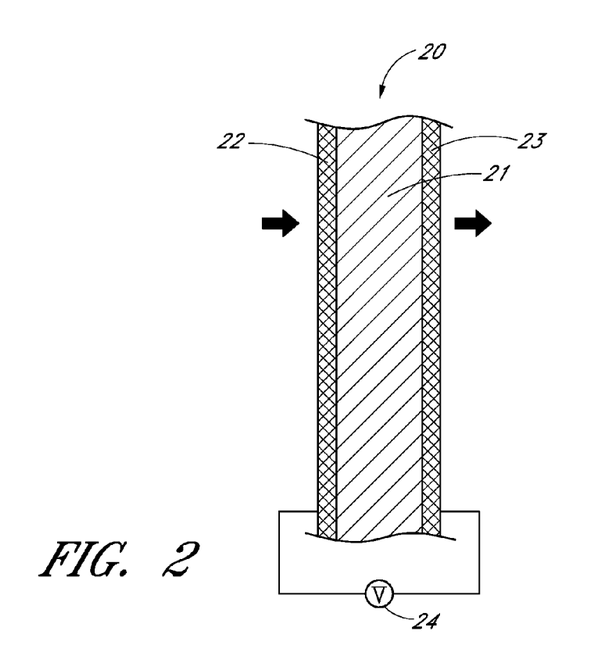
FIG. 2 is an illustration of a device including a filter in accordance with some embodiments.

FIG. 2 is an illustration of a filter 20 for removing contaminants from air in accordance with some embodiments. The filter includes a porous member 21 containing an ionic liquid. The porous member 21 also has a reactive oxygen species dissolved in the ionic liquid. Electrodes 22, 23 contact opposing sides of the porous member 21. In some embodiments, the negative electrode 22 is on the upstream side of the porous member and the positive electrode 23 is on the downstream side of the porous member. In some embodiments, the negative electrode 22 is positioned upstream of the positive electrode 23 (so that air flows through or around the negative electrode before the positive electrode). In some embodiments, the negative electrode 22 is downstream of the positive electrode 23 (so that air flows through the negative electrode after air flows by the positive electrode).

In some embodiments, the reactive oxygen species can also be generated in the porous member 21 by a reactive oxygen species generator (in this case electrodes 22, 23, which can be powered by a power source 24). For example, the power source 24 can provide an electrical current to the electrodes 22, 23 that contact the porous member 21, thereby charging a negative electrode 22 and a positive electrode 23. Oxygen in the air passing through the porous member contacting the filter at or around the negative electrode can be converted to an excited species, for example $O_2$—. However, the reactive oxygen species can be stabilized in the ionic liquid, due to the nature of the ionic liquid. Due to the porous nature of the filter 20, the air can still flow through the filter (and porous member 21) and thus can still come into contact with the reactive oxygen species. Thus, this arrangement allows for the reactive oxygen species to be exposed enough to the air to react with various contaminants in the air, thereby removing the contaminants from the air, while protecting the reactive oxygen species sufficiently by the presence of the ionic liquid.

Figure 3A:
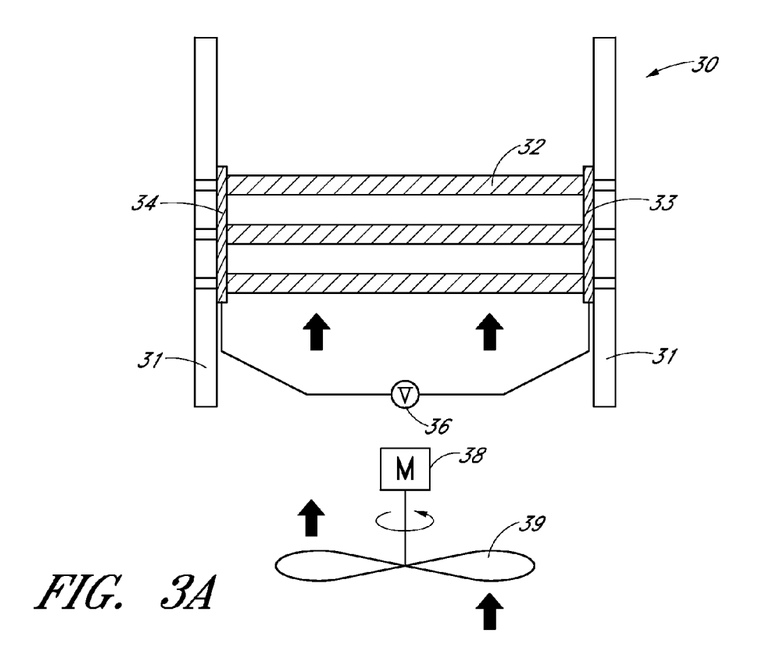
FIG. 3A is an illustration of a device including a filter in accordance with some embodiments.

FIG. 3A is an illustration of a device 30 in accordance with some embodiments. The device 30 has several porous members 32 with ionic liquid contained in the porous member. The porous member 32 has a positive electrode 33 at one end and a negative electrode 34 at an opposing end. The electrodes 33, 34 contact sides 31 of the device 30. A source of electricity 36 can provide an electrical current to the electrodes 33, 34 that contact the porous member 32. In some embodiments, a fan can be used down stream and/or upstream of the porous member 32 to facilitate the flow of air across the porous member 32. In some embodiments, the fan can include a motor 38 and blades 39 to create a pressure differential across the porous member. The reactive oxygen species generator (in this embodiment, electrodes 34 and 33) can generate reactive oxygen species in the ionic liquid by applying electrical power to oxygen containing species present in the atmosphere. In some embodiments, the reactive oxygen species can exist more stably and continue to react with contaminants in the air that pass through the device.

Figure 3B:
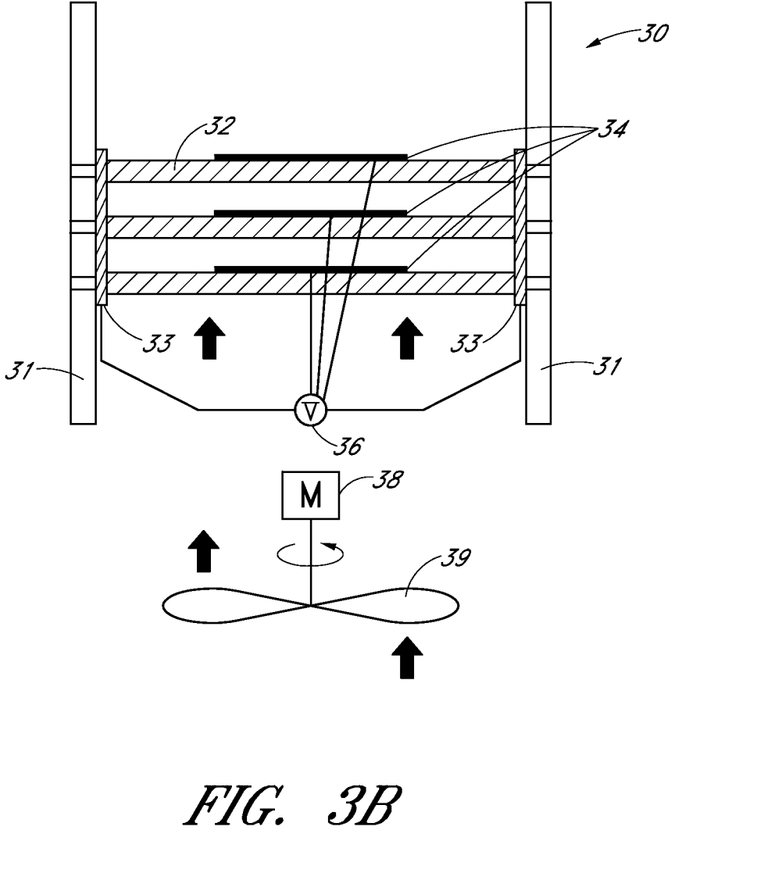
FIG. 3B is an illustration of a device including a filter in accordance with some embodiments.

FIG. 3B is an illustration of a device 30 in which the positive electrodes 34 and the negative electrodes 33 can be positioned differently. In the depicted embodiment, the positive electrode 34 can be positioned within the path of the air flow, while the negative electrodes 33 can be positioned on the sides. In some embodiments, this arrangement of positive and negative can be reversed. In some embodiments, such as that in FIG. 2, there can be very little or no increase in oxygen due to use of the device. For example, in an embodiment as shown in FIG. 2, $O_2$ in the air becomes $O_2$— at the negative electrode, and then can move in the ionic liquid, where it releases electrons at the positive electrode and turn back into $O_2$. Thus, there is little change in $O_2$ levels as the air completes its purification process. In FIG. 3A, both electrodes can be connected to external air. The $O_2$ in the external air becomes $O_2$— at the negative electrode, then it can move into and through the ionic liquid where it releases electrons at the positive electrode and then turn back into $O_2$ and can be released to the outside. Thus, there can be little change in $O_2$ levels as the air completes its purification process.

In embodiments in which one wishes to increase the amount of oxygen, the negative electrode can be connected to the outside (air intake) of the device and the positive electrode can be positioned inside the device (and in some embodiments is not open to the outside (as shown in FIG. 3B).

Figure 4:
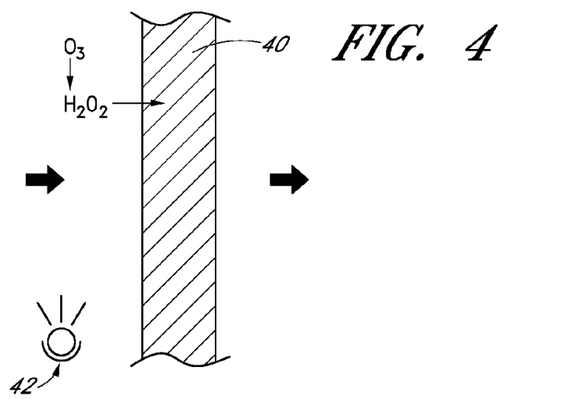
FIG. 4 is an illustration of a device including a filter in accordance with some embodiments.

FIG. 4 is an illustration of a device in accordance with some embodiments. The filter 40, which includes a porous member, can contain an ionic liquid (not shown). In some embodiments, the reactive oxygen species generator can be located on the upstream side of the filter and can be a source of ultraviolet (UV) light 42. The UV light produces excited species (e.g., reactive oxygen species) in the air such as ozone ($O_3$) and hydrogen peroxide ($H_2O_2$). The ozone and hydrogen peroxide can dissolve in the ionic liquid present in the filter and remain stable. The excited species can exist more stably in the ionic liquid and continue to react with contaminants in the air to thereby fully or partially remove at least one contaminant from the air stream.

Figure 5:
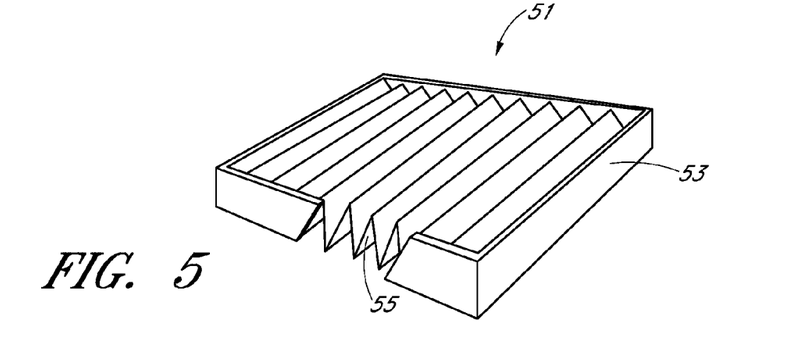
FIG. 5 is an illustration of a filter in accordance with some embodiments.

FIG. 5 is an illustration of a filter cartridge 51 in accordance with some embodiments. The illustrated filter cartridge 51 has a perimeter 53 surrounding a folded and/or corrugated porous member 55. The folded aspect of the porous member 55 in the filter cartridge 51 increase the surface area of the filter that contacts the material passing through the filter cartridge 51. In some embodiments, the filter cartridge 51 is a wet filter that can contain an ionic liquid or other liquid present in the filter. In some embodiments, a stream of air can have contaminants removed by passing the stream across the porous member 55. In some embodiments, the filter contains at least one ionic liquid and at least one reactive oxygen species.

Figure 6:
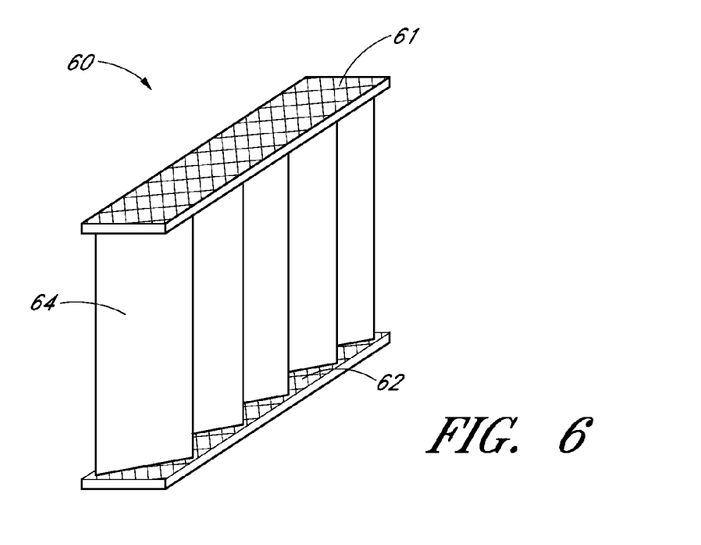
FIG. 6 is an illustration of a side view of a filter in accordance with some embodiments.

FIG. 6 is an illustration of a side view of a filter 60 in accordance with some embodiments. In some embodiments, the filter 60 has opposing ends 61, 62, which can be, for example, solid or mesh. In some embodiments, the ends 61, 62 can be made out of metal and function as electrodes. In some embodiments, the porous member 64 is folded or corrugated to increase the surface area that contacts the stream of air. In some embodiments, the filter 60 contains an ionic liquid. In some embodiments, the filter 60 contains at least one ionic liquid and at least one reactive oxygen species. In some embodiments, the ends 61, 62 are configured to be connected to a source of electrical current. In some embodiments, the material that the porous member 64 is composed of is compatible with the flow of electrical current from one end 61 across the porous member 64 to the other end 62. In some embodiments, the material that the porous member 64 is composed of will not substantially decompose or create pollutants when electrical current is applied on one end 61, and across the porous member 64, to the other end 62.

The methods and devices disclosed herein can be used in a variety of applications. In some embodiments the filters and devices can be used as part of a commercial air filtration system, for example as part of a HVAC duct or in an air conditioning unit. In some embodiments, the methods and devices can be used in portable or standalone air purifiers. The methods and devices can be used in cars, trucks, airplanes, helicopters, dirigibles, trains, subways, boats, submarines, or other vehicles.

In some embodiments, a specific amount of the reactive oxygen species is generated for inclusion into the filter and/or porous member. For example, in some embodiments, when a current of 1 A is flowing over the entire filter, the number of reactive oxygen species flowing over the cross section per second can be $6 \times 10^{18}$. For example an electron has a charge of $1.6 \times 10^{-19}$ C. One Coulomb is equal to one amp per second. The concentration of reactive species can be calculated by taking the inverse of the charge, e.g. $1/1.6 \times 10^{-19}$, which equals $6 \times 10^{18}$. The relationship between the voltage and current of the designed filter can be determined for each filter, as resistance varies in a predictable manner depending on the configuration of the filter and electrodes. Voltage can then be set according to the amount of reactive oxygen species to be generated. Alternatively, by allowing for the use of variable voltage, the amount of reactive oxygen species can be controlled automatically or manually in the case of a highly polluted air environment. In some situations, once the moisture in the air is trapped in the ionic liquid, protons ($H^+$) can be generated, and this can hinder the stable existence of the reactive oxygen species, such as $O_2^-$. Thus, in some embodiments, one can supply a voltage that is over the voltage where the electrolysis of water occurs. For example, at 25° C., one can have a voltage higher than the voltage needed for the electrolysis of water, e.g., 1.229V. In some embodiments, the voltage is 0.5 or greater, for example, 0.6, 0.7, 0.8, 0.9, 1, 1.1, 1.2, 1.3, 1.4, 1.5, 1.6, 1.7, 1.8, 1.9, 2, 2.1, 2.2, 2.5, 3, 4, 5, 6, 7, 8, 9, 10, 15, 20, 25, 30, 40, 50, 60, 70, 80, 90, 100, 120, 150, 200, or 240 V, including any range greater than any of the preceding values and any range defined between any two of the preceding values.

Additional Embodiments, Alternatives, and/or Variations

The following sections provide greater detail regarding various components noted above. Any of these embodiments can be and are considered to be disclosed in combination with any of the embodiments described above and below. The headings are provided for ease of review only, and are not limiting in any way.

Filter

In some embodiments, at least one filter can be used in the devices and methods disclosed herein. In some embodiments, the filter includes a porous member. In some embodiments, the filter is a "wet filter," denoting a filter that is capable of containing a liquid. In some embodiments, the filter is any structure that is capable of acting as a support for an ionic liquid. In some embodiments, the filter is any structure that is capable of acting as a support for an ionic liquid and can allow air to contact the ionic liquid. In some embodiments, the filter is any structure that is capable of acting as a support for an ionic liquid and can allow air to pass through the structure so as to allow the air to contact the ionic liquid and then allow the air to leave the structure.

In some embodiments, multiple filters can be used in the methods and devices disclosed herein. In some embodiments, the filters are arranged in series, and can thus be "stacked". In some embodiments, the filters can be used in parallel. The multiple filters can be identical or different depending on the desired filtration properties.

In some embodiments, the contaminated air flows completely through the filter or wet filter.

In some embodiments, the wet filter can be purchased commercially with the ionic liquid added later. In some embodiments, there is substantially no water present in the wet filter.

In some embodiments electrodes can be attached to opposing sides of the filter or wet filter. In some embodiments metal mesh is used for the electrodes. In some embodiments, the filter does not have electrodes. In some embodiments, the filtration device has electrodes that contact the filter or are in fluid communication with the filter when the filter is installed in the device.

In some embodiments, the filter or wet filter is corrugated or folded (or more specifically, the porous member). The surface area of the filter can be increased by folding it to form a corrugated shape (e.g., FIGS. 5 and 6) or in other ways. In some embodiments the filter or wet filter has a cross sectional area that is substantially rectangular, substantially square, or substantially round. In some embodiments, the filter or wet filter has liquid flow channels configured to allow the ionic liquid to be distributed across the porous material. In some embodiments, a channel can run along a top side of the filter or wet filter so that the liquid can wick downward across the porous material or membrane. In some embodiments, one or more channels can be run along a side or bottom of the filter. In some embodiments, the filter does not include a channel for the ionic liquid, but rather the filter is submerged in the liquid initially or the ionic liquid can be sprayed onto the filter. In some embodiments the filtration device can periodically add additional ionic liquid to the filter.

In some embodiments the air leaving the filter has approximately 78% nitrogen. In some embodiments, the air entering the filter is the same as the air leaving the filter, except that at least one impurity has been removed from the air. In some embodiments, the amount of oxygen on an entering side of the filter is about the same as the amount of oxygen on the exiting side of the filter. In some embodiments, any increase in oxygen from when the air passes through the filter, when the filter is in use, is minimal. In some embodiments, any increase in oxygen from when the air passes through the filter, when the filter is in use, is less than 200%, for example, 199, 190, 180, 150, 100, 80, 70, 60, 50, 40, 30, 20, 10, 9, 8, 7, 6, 5, 4, 3, 2, 1.5, 1.4, 1.3, 1.2, 1.1, 1, 0.9, 0.8, 0.7, 0.6, 0.5, 0.4, 0.3, 0.2, 0.1, 0.01 percent or less, including any range less than any of the preceding values and any range defined between any two preceding values. In some embodiments, the amount of oxygen generated as the air passes through the system is less than about 10%, for example between 10% and 0.1%. In some embodiments, the amount of oxygen generated as the air passes through the system is less than 0.6%.

Porous Member

In some embodiments, the porous member is configured so as to retain an amount of the ionic liquid throughout a useful section of the porous member, while allowing for air to come into contact with the ionic liquid. The porous member is porous. In some embodiments, the pores, holes, gaps, etc, allow flow from one side of the porous member to another side of the member.

In some embodiments, the porous member can be made out of metal mesh, laminated metal, cellulose, carbon, ceramic, resin, plastic, protein, nonwoven cloth, woven cloth, or any combination thereof. In some embodiments, the porous member is made from a UV resistant material. In some embodiments, the porous member is made from a reactive oxygen species resistant material. In some embodiments, the porous member is made from a oxygen resistant material. In some embodiments, the porous member is relatively or completely inert when an electrical current is run across it. In some embodiments, the porous material is relatively or completely inert to the ionic liquid. In some embodiments, the porous member is relatively or completely inert to water. In some embodiments, the porous member is relatively or completely inert to two or more of the preceding items.

The term "relatively inert" does not require that the structure be immune or unaffected by the force or substance. Rather, the term denotes that the impact that the substance or force has on the material is inconsequential to the ability of that material to function, over the accepted lifespan of that material. Thus, for example, if a porous member generally lasts 1 month when in use (as a filter but without the substance (such as the liquid) or force (such as electricity) being applied to it), and the porous member can serve its function as a filter in the presence of the substance or force for one month, then the material is "relatively inert."

In some embodiments, air passes from a first side through to an opposite side of the porous member. In some embodiments, air passes from a first side to a neighboring side of the porous member, but still passes through the porous member.

In some embodiments, the porous member is relatively planar or flat in nature, so as to present a relatively large cross-section for air flow, with relatively little material required.

In some embodiments, providing additional thickness to the porous member in the direction that the airflows through the porous member allows for greater purification (as the air will stay in the porous member longer). In some embodiments, greater purification can be provided with the same or thinner pieces or thicknesses of porous members by providing superior ionic liquids (to keep the reactive oxygen species around longer) or greater amounts of electricity (to produce larger amounts of reactive oxygen species).

It is noted that the term "filter," in some technologies, may denote a structure configured to catch and restrain particulates. However, that meaning is not limiting for the present disclosure and embodiments. As used herein, "filter" and/or "filtering" is not limited to physical filtering (nor does it always require it) and is instead directed to the chemical process of using a reactive oxygen species as a filtering/sterilizing agent. Thus, in some embodiments, the porous member is configured so that it allows particulates to flow through it. In some embodiments, the porous member is configured so that it traps particulates on the first side, preventing them from flowing through to the second side. In some embodiments, the filter and/or porous member is configured so as to allow larger items (such as bacteria) to flow through it, but the presence of the reactive oxygen species will damage and/or kill at least some of the bacteria. Such an arrangement can be advantageous, as it will reduce physical clogging of the filter while still providing an effective filtering/sterilization process.

In some embodiments, the porous member has a thickness of more than 260 micrometers, for example 261 micrometers, 300 micrometers, 400 micrometers, 500 micrometers, 600 micrometers, 700 micrometers, 800 micrometers, 900 micrometers, 1000 micrometers, 2 mm, 5 mm, 10 mm, 1.1 cm, 1.2 cm, 1.3 cm, 1.4 cm, 1.5 cm, 1.6 cm, 1.7 cm, 1.8 cm 1.9 cm, 2 cm, 5 cm, 10 cm, 15 cm, 50 cm, or more, including any range above any of the preceding values and any range between any two of the preceding values. In some embodiments, the porous member has a thickness of more than 1 millimeter. In some embodiments, the porous member can have a pore size of about 30-300 μm.

In some embodiments, the porous member containing the ionic liquid is permeable to an air stream. In some embodiments the porous member containing the ionic liquid has an air permeability (*p=200 pa L/m2·S) of about 350±30.

The Gurley Value can also be used to express permeability of a membrane. The Gurley Value is defined as the time in seconds required for 100 cc of air to pass through a membrane at 0.879 $g/m^2$ pressure (conforming to JIS P8117). In some embodiments, the Gurley value is under 3000 sec., for example, 2000, 1000, 500, 100, 50, 30, 20, 10, 5, 2, or 1 sec., including any range beneath any of the preceding values and any range defined between any two of the preceding values.

Electrodes

In some embodiments, any electrode can be employed, when needed, as long as it allows for the production of a reactive oxygen species. In some embodiments, no electrode is needed.

In some embodiments, the electrodes are placed on opposite sides (front and back or left and right, etc) of a porous member. In some embodiments, the electrodes are porous, allowing air to pass through them.

In some embodiments, the electrodes are made from or coated with a conducting material such as steel, copper, aluminum, titanium, Au, Pt, Ag, Ni, Fe, W, Pd, Ru, Rh, Ir, Ti, Mo, Co, Sn, Bi, Pb, Zn, or an alloy thereof. In some embodiments, forms of carbon such as glassy carbon, graphite, carbon black, carbon paste, carbon fiber, activated carbon, or conductive metal oxide can be used. In some embodiments, electrodes of carbon can be used. Examples of some materials are included in Japanese Patent Publication 2009-138254A, herein incorporated by reference in its entirety.

In some embodiments, the electrode is made from a UV resistant material. In some embodiments, the electrode is made from a reactive oxygen species resistant material. In some embodiments, the electrode is made from a oxygen resistant material. In some embodiments, the electrode is relatively inert when an electrical current is run across it. In some embodiments, the electrode is relatively inert to the ionic liquid. In some embodiments, the porous member is relatively or completely inert to water. In some embodiments, the electrode is relatively inert to two or more of the preceding items.

Ionic Liquid

In some embodiments, ionic liquids typically have almost a zero vapor pressure, high ion conductivity, and are chemically and thermally stable. In some embodiments, ionic liquids typically dissolve gases and ions easily.

In some embodiments the wet filter contains an ionic liquid. In some embodiments the ionic liquid has a low vapor pressure or steam pressure. In some embodiments the ionic liquid can be an aprotic solvent. In some embodiments the ionic liquid has a steam pressure or vapor pressure of less than about 20 Pa, for example 19, 18; 17, 16, 15, 14, 13, 12, 11, 10, 9, 8, 7, 6, 5, 4, 3, 2, 1, or less Pa, including any range less than any of the preceding values and any range defined between any two of the preceding values.

In some embodiments the ionic liquid can be acetonitrile (MeCN), dimethyl formamide (DMF), dimethyl sulfoxide (DMSO), quaternary ammonium, compounds with an imidazolium group, or any combination thereof. In some embodiments, the ionic liquid can be pyrrolidinium salt, pyridinium salt, ammonium salt, phosphonium salt, sulfonium salt, pyridinium compound, phosphonium compound, and/or quaternary ammonium compound. In some embodiments, the ionic liquid can include, 1-butyl-2,3-dimethylimidazolium chloride, 1-butyl-2,3-dimethylimidazolium polyethylene glycol hexadecyl ether sulfate coated lipase, 1-butyl-3-methylimidazolium hexafluorophosphate, 1-butyl-3-methylimidazolium, tetrafluoroborate, 1,3-dimethylimidazolium dimethyl phosphate, 1,2-dimethyl-3-propylimidazolium iodide, 1-ethyl-3-methylimidazolium trifluoromethanesulfonate, and/or 1-hexyl-3-methylimidazolium chloride.

In some embodiments the reactive oxygen species is stable for at least 8, 9, 10, 15, 20, 30, 40, 50, 60, 70, 80, 90, 100, 150, 200, 300, 400, 500, 1000, 2000, 3000, 4000, 5000, 6000 or more seconds in the ionic liquid, including any range higher than any of the preceding values and any range defined between any two of the preceding values. In some embodiments, the migration speed of ions in the ionic liquid depends on the voltage. In some embodiments, the migration speed can be 10 micrometers/sec.~100 micrometers/sec. Thus, in some embodiments, it can take 100-5000 seconds to migrate a few cm to 10 cm.

In some embodiments the ionic liquid has poor water solubility. In some embodiments the ionic liquid preferably contains substantially no water. In some embodiments, the presence of water can inhibit the formation or presence of the anionic reactive oxygen species, such as $O_2-$.

In some embodiments, water can be removed using a hydrophobic ionic liquid, such as N—N-diethyl-N-methyl-N-(2-methoxyethyl)ammonium bis(trifluoromethanesulfonyl)imid). In some embodiments, water can be removed by increasing the drive voltage so as to electrolyze the water. For example, at 25° C. water can be removed by applying a voltage of at least 1.229 V.

In some embodiments, the wet filter can be impregnated with an ionic liquid and with a reactive oxygen species. In some embodiments, ionic liquids have a steam pressure or vapor pressure of almost zero and therefore can be used in the atmosphere for a long time without evaporating. Ionic liquids can also actively dissolve ions and polar molecules and allow such molecules to exist stably. As outlined herein, reactive oxygen species can be introduced into the ionic liquid. In some embodiments, hydroxyl radicals can be generated by the reactive oxygen species generator.

Generating Reactive Oxygen Species

In some embodiments a reactive oxygen species is generated. In some embodiments, the reactive oxygen species is generated using an electrical current. In some embodiments, the reactive oxygen species is generated by reduction.

In some embodiments the reactive oxygen species can include ozone, oxygen radicals, atomic oxygen, $O_2-$, hydroxyl radicals, hydrogen peroxide, or any combination thereof.

In some embodiments the current is applied continuously. In some embodiments the current is applied periodically.

In some embodiments, the voltage is selected to achieve a desired concentration of the reactive oxygen species in the ionic liquid. The applied voltage can also vary based on the resistance between the electrodes and the desired current. For example, the resistance can vary based on the configuration of the electrodes, distance between the electrodes, concentration of ionic liquid, filter material, etc.

In some embodiments ultraviolet light can be used to generate the reactive oxygen species. In some embodiments, the ultraviolet light can be used to generate ozone and/or hydrogen peroxide ($H_2O_2$). In some embodiments, the ultraviolet light is configured to employ between 1 and 100 W, for example 5-20 W.

In some embodiments, the reactive oxygen species can be generated adjacent to the wet filter or just upstream of the filter. For example, it is possible to generate the reactive oxygen species by performing electric discharge or ultraviolet light irradiation immediately in front of the wet filter containing the ionic liquid. The generated reactive oxygen species is then introduced to the ionic liquid in the wet filter and can exist stably. In some embodiments, the distance between the generator and the filter is such that it takes less than 10 seconds (e.g., less than 5 seconds) for the reactive oxygen species to travel from the source to dissolve in ionic liquid in the filter.

In some embodiments, the concentration of reactive oxygen species across the filter can be relatively uniform because the ions diffuse quickly in the ionic liquid.

Contaminants

The methods and devices disclosed herein can be used to remove a variety of contaminants from gaseous streams, for example, volatile organic compounds (VOC), odors, bacteria, mold, ammonia, smoke, contaminants, and other hazardous materials can be removed from the treated gaseous or air streams. In some embodiments, the contaminants are virus, carbon particle (e.g. from diesel engine), and/or pollen (this causes "hay fever").

Filter Cartridge

In some embodiments a filter cartridge is provided that includes a frame that supports a porous member. In some embodiments, the porous member contains pores that pass from a front surface of the porous member to a back surface of the porous member so as to allow air to flow from the front surface through and out of the back surface of the porous member. In some embodiments a filter cartridge is provided that includes a wet filter (including a porous member) with an ionic liquid.

In some embodiments, the filter cartridge has electrodes on opposing sides of the frame, e.g. a cathode on one side and an anode on the other side. In some embodiments the electrodes are made of a metal mesh. In some embodiments, the electrodes are solid plates.

In some embodiments, the filter cartridge does not contain electrodes but contacts a positive and negative electrode when installed in the filtration device. In some embodiments the first and second electrodes are in fluid communication with the wet filter.

In some embodiments the filter cartridge includes a porous material configured to retain an ionic liquid.

As used herein, a "filter cartridge" denotes a structure that includes the porous member and, if necessary, a supporting structure for the porous member. A "filter" is a more generic term and does not necessarily include a supporting structure for the porous member.

Kit

In some embodiments a kit is provided including a wet filter or filter with pores with the pores starting on a first surface of the wet filter and passing through the wet filter to a second surface. In some embodiments, the kit also includes an ionic liquid and a reactive oxygen species generator. In some embodiments the first surface of the wet filter is on an opposite side to the second surface of the wet filter. In some embodiments a kit is provided including a porous member with pores with the pores starting on a first surface of the porous member and passing through the porous member to a second surface. In some embodiments, the kit also includes an ionic liquid and a reactive oxygen species generator. In some embodiments the first surface of the porous member is on an opposite side to the second surface of the porous member.

In some embodiments the kit also includes a first and second electrode. In some embodiments the reactive oxygen species generator includes the first electrode and the second electrode. In some embodiments the wet filter and/or porous member is attached to the first electrode and the second electrode. In some embodiments the first and second electrodes are in fluid communication with the wet filter and/or porous member.

Air Circulator

In some embodiments an air circulator is used to promote air flow across the wet filter. In some embodiments, the air circulator is upstream of the wet filter. In some embodiments, the air circulator is downstream of the wet filter.

In some embodiments the air circulator is configured to provide a positive air pressure against the first surface of the wet filter.

In some embodiments, the air circulator is a fan that includes a motor 38 and fan blades 39. In some embodiments, the air circulator is an air pump, blower, or other device known in the art to be capable of facilitating air flow through a filter or generating a pressure differential between an upstream side of the filter and downstream side of the filter.

In some embodiments, the use of a filter with the reactive oxygen species allows for control over the contact between the air and the reactive oxygen species. For example, the retention time and area of the filter can be selected such that a desired amount of reactive oxygen species contacts the air. The ionic liquid can absorb hazardous organic substances and VOC but these organic substances and VOC are decomposed by reactive oxygen species.

In some embodiments, the filters can be sized such that the filter can be used in conventional air cleaners. In addition, a filter with electrodes and a power source can be installed into conventional air cleaners and air conditioners.

In some embodiments, the filter can be impregnated with an ionic liquid but does not use a large amount of ionic liquid as it is retained by the porous member.

Example 1

A wet filter of glass fiber having an unwoven membrane that is impregnated with an ionic liquid (N,N-diethyl-N-methyl-N-(2-methoxy ethyl) ammonium bis(trifluoromethane sulfonyl)imide) is used to filter air. The filter has two electrodes on opposing sides made of a metal mesh. The first electrode is on a first side of the perimeter of the filter and the second electrode is on a second side of the perimeter, opposite the first side. A selected voltage of 2.0 V is applied to the electrodes such that current flowing between the electrodes generates a reactive oxygen species. The reactive oxygen species includes $O_2$— that is generated from diatomic oxygen.

A fan located upstream of the filter is used to promote contaminated air flow through the filter. The air flows through the filter. The reactive oxygen species, including $O_2$—, reacts with various contaminants, such as VOC, bacteria, odors, and other undesirable materials in the air stream, thereby sterilizing the air.

Example 2

Methods and equipment similar to Example 1 are used in Example 2 but with a different configuration for the filter. The filter has two electrodes on opposing sides made of a metal mesh. The first electrode is on an upstream side of the filter and the second electrode is on an opposing downstream side of the filter. The contaminated air first contacts the first side and electrode thereby generating additional reactive oxygen species when the voltage is applied to the electrodes. Typically, the applied voltage of 1.5 V can be lower in this configuration to generate a given current across the filter in comparison to the configuration in Example 1 because the resistance between the electrodes is lower due to the electrodes being closer together.

Example 3

A wet filter of carbon fiber woven membrane is impregnated with an ionic liquid to filter air. A reactive oxygen species is dissolved into N-methyl-N-Butylpyrrolidinium Bis (trifluoromethanesulfonyl)imide. The reactive oxygen species is generated using a UV light (of 185 nm via a low-pressure mercury lamp) located on the upstream side of the filter. When the UV light is applied to the contaminated air, ozone and/or hydrogen peroxide is generated. The ozone and/or hydrogen peroxide dissolves in the ionic liquid. The reactive oxygen species can exist stably in the ionic liquid.

A fan located upstream of the filter is used to promote contaminated air flow through the filter. The air flows all the way through the filter. The reactive oxygen species reacts with various contaminants, such as VOC, bacteria, odors, and other undesirable materials in the air stream.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A kit comprising:
   a wet filter comprising a porous member, wherein pores in the porous member start on a first surface of the wet filter and pass through the porous member to a second surface of the wet filter;
   an ionic liquid; and
   a reactive oxygen species generator, wherein the reactive oxygen species generator comprises a source of ultraviolet light.

2. The kit of claim 1, wherein the first surface is opposite the second surface.

3. The kit of claim 1, wherein the wet filter contains the ionic liquid.

4. The kit of claim 3, wherein the ionic liquid comprises: acetonitrile (MeCN), dimethyl formamide (DMF), dimethyl sulfoxide (DMSO), quaternary ammonium, compounds comprising an imidazolium group, or any combination thereof.

5. The kit of claim 1, further comprising an air circulator configured to assist air from a first side of the wet filter to a second side of the wet filter.

6. A filter cartridge comprising:
   an anode;
   a cathode;
   a porous member, wherein the porous member comprises pores that pass from a front surface of the porous member to a back surface of the porous member so as to allow air to flow from the front surface through and out of the back surface of the porous member, wherein the porous member is configured to retain an ionic liquid, and wherein the anode and the cathode are positioned on opposite sides of the porous member, wherein an average pore size of the pores is 30-300 μm.

7. The filter cartridge of claim 6, wherein the anode is positioned on a first side of the porous member and the cathode is positioned on the opposite side of the porous member.

8. The filter cartridge of claim 6, wherein the anode is positioned against the front surface of the porous member and the cathode is positioned against the back surface of the porous member.

9. The filter cartridge of claim 6, further comprising a flow channel, wherein the flow channel is configured to allow an ionic liquid to be distributed across the porous member.

10. The filter cartridge of claim 6 further comprising an ionic liquid, wherein the ionic liquid comprises: acetonitrile (MeCN), dimethyl formamide (DMF), dimethyl sulfoxide (DMSO), quaternary ammonium, compounds comprising an imidazolium group, or any combination thereof.

11. The filter cartridge of claim 10, wherein there is substantially no water present in the ionic liquid solution.

12. The filter cartridge of claim 6 wherein the porous member comprises cellulose, a non-woven cloth, or a combination thereof.

13. The filter cartridge of claim 6, wherein the porous member is more than 260 micrometers thick.

14. The filter cartridge of claim 6, wherein the porous member is more than 1 millimeter thick.

15. A filter cartridge comprising:
an anode;
a cathode;
a porous member, wherein the porous member comprises pores that pass from a front surface of the porous member to a back surface of the porous member so as to allow air to flow from the front surface through and out of the back surface of the porous member, wherein the porous member is configured to retain an ionic liquid, and wherein the anode and the cathode are positioned on opposite sides of the porous member, wherein the porous member is more than 260 micrometers thick.

16. The filter cartridge of claim 15, wherein the anode is positioned on a first side of the porous member and the cathode is positioned one the opposite side of the porous member.

17. The filter cartridge of claim 15, wherein the anode is positioned against the front surface of the porous member and the cathode is positioned against the back surface of the porous member.

18. The filter cartridge of claim 15, wherein an average pore size of the pores is 30-300 µm.

19. The filter cartridge of claim 15, further comprising a flow channel, wherein the flow channel is configured to allow an ionic liquid to be distributed across the porous member.

20. The filter cartridge of claim 15 further comprising an ionic liquid, wherein the ionic liquid comprises: acetonitrile (MeCN), dimethyl formamide (DMF), dimethyl sulfoxide (DMSO), quaternary ammonium, compounds comprising an imidazolium group, or any combination thereof.

21. The filter cartridge of claim 20, wherein there is substantially no water present in the ionic liquid solution.

22. The filter cartridge of claim 15, wherein the porous member comprises cellulose, a non-woven cloth, or a combination thereof.

23. The filter cartridge of claim 15, wherein the porous member is more than 1 millimeter thick.

* * * * *